United States Patent
Luccin et al.

(10) Patent No.: US 10,362,241 B2
(45) Date of Patent: Jul. 23, 2019

(54) VIDEO STREAM DELIMITER FOR COMBINED FRAME

(71) Applicant: Microsoft Technology Licensing, LLC, Redmond, WA (US)

(72) Inventors: Karim Luccin, Redmond, WA (US); John M. Copic, Redmond, WA (US); Eric Scott Rehmeyer, Kirkland, WA (US); Jessica Zahn, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/396,101

(22) Filed: Dec. 30, 2016

(65) Prior Publication Data
US 2018/0191963 A1   Jul. 5, 2018

(51) Int. Cl.
*H04N 5/262* (2006.01)
*H04N 5/265* (2006.01)
*H04N 21/236* (2011.01)

(52) U.S. Cl.
CPC ........... *H04N 5/265* (2013.01); *H04N 5/2628* (2013.01); *H04N 21/236* (2013.01)

(58) Field of Classification Search
CPC .... H04N 5/265; H04N 5/9261; H04N 5/2628; H04N 7/01; G06T 7/73; G06T 7/60; G06T 7/11
See application file for complete search history.

(56) References Cited

U.S. PATENT DOCUMENTS

| | | | | |
|---|---|---|---|---|
| 5,258,837 | A | * | 11/1993 | Gormley .......... G08B 13/19645 348/441 |
| 6,075,571 | A | * | 6/2000 | Kuthyar .................. H04N 7/15 348/14.07 |
| 6,147,695 | A | | 11/2000 | Bowen et al. |
| 6,157,396 | A | | 12/2000 | Margulis et al. |
| 6,924,807 | B2 | * | 8/2005 | Ebihara ..................... G06T 1/20 345/503 |
| 8,165,424 | B1 | | 4/2012 | Lovejoy |
| 8,270,473 | B2 | | 9/2012 | Chen et al. |

(Continued)

OTHER PUBLICATIONS

Krahenbuhl, et al., "A System for Retargeting of Streaming Video", In Journal of ACM Transactions on Graphics, vol. 28, Issue 5, Dec. 2009, 10 pages.

(Continued)

*Primary Examiner* — Timothy J Henn
(74) *Attorney, Agent, or Firm* — Alleman Hall Creasman & Tuttle LLP

(57) ABSTRACT

According to one aspect of the present disclosure, a server is provided, comprising a processor configured to produce a combined frame from two or more video streams. The combined frame may include two or more panels, wherein each panel includes one of the two or more video streams. The combined frame may further include panel metadata indicating a set of coordinates for each panel. The coordinates of each panel may indicate a height, width, and position of that panel. The combined frame may further include at least one delimiter region of pixels formed between the panels. The processor may be further configured to transmit the combined frame over a network for output on a display device.

19 Claims, 8 Drawing Sheets

(56) References Cited

U.S. PATENT DOCUMENTS

| | | | |
|---|---|---|---|
| 8,369,399 B2 | 2/2013 | Egnal et al. | |
| 8,537,195 B2 | 9/2013 | Duckworth et al. | |
| 8,633,962 B2 | 1/2014 | King et al. | |
| 9,167,176 B2 | 10/2015 | Winter et al. | |
| 9,241,167 B2 | 1/2016 | Wu et al. | |
| 9,756,286 B1* | 9/2017 | Faulkner | H04L 65/403 |
| 2002/0047928 A1* | 4/2002 | De Meersman | H04N 5/45 |
| | | | 348/566 |
| 2004/0218099 A1* | 11/2004 | Washington | H04N 5/77 |
| | | | 348/571 |
| 2008/0181498 A1* | 7/2008 | Swenson | G09G 5/14 |
| | | | 382/173 |
| 2009/0179904 A1* | 7/2009 | Racicot | H04N 5/44591 |
| | | | 345/505 |
| 2009/0300676 A1* | 12/2009 | Harter, Jr. | H04N 5/782 |
| | | | 725/35 |
| 2009/0309897 A1* | 12/2009 | Morita | H04M 1/2535 |
| | | | 345/629 |
| 2010/0149308 A1* | 6/2010 | Mihara | H04N 7/152 |
| | | | 348/14.09 |
| 2012/0163472 A1* | 6/2012 | Sole Rojals | H04N 19/176 |
| | | | 375/240.24 |
| 2013/0135435 A1 | 5/2013 | D'Amato et al. | |
| 2013/0173819 A1 | 7/2013 | Lee et al. | |
| 2014/0245148 A1* | 8/2014 | Silva | H04N 5/44591 |
| | | | 715/719 |
| 2015/0058448 A1 | 2/2015 | Proctor | |
| 2015/0195489 A1* | 7/2015 | Sobti | H04N 7/142 |
| | | | 348/14.08 |
| 2016/0173823 A1* | 6/2016 | Duckworth | H04N 7/152 |
| | | | 348/14.07 |
| 2017/0223083 A1* | 8/2017 | Maze | H04N 21/234327 |
| 2017/0332044 A1* | 11/2017 | Marlow | G06K 9/00268 |

OTHER PUBLICATIONS

"How to resize the video in HTML5 dynamically?", Published on: Sep. 27, 2013 Available at: http://stackoverflow.com/questions/15698961/how-to-resize-the-video-in-html5-dynamically.

* cited by examiner

US 10,362,241 B2

VIDEO STREAM DELIMITER FOR COMBINED FRAME

BACKGROUND

When using some applications, a user may want to stream multiple video streams to a display device concurrently. However, concurrently streaming multiple video streams may use large amounts of bandwidth. Decoding and rendering multiple simultaneous video streams may also require large amounts of computing power. As a result, a display device might not be able to stream and render multiple simultaneous video streams in real time.

SUMMARY

According to one aspect of the present disclosure, a server is provided, comprising a processor configured to produce a combined frame from two or more video streams. The combined frame may include two or more panels, wherein each panel includes one of the two or more video streams. The combined frame may further include panel metadata indicating a set of coordinates for each panel. The coordinates of each panel may indicate a height, width, and position of that panel. The combined frame may further include at least one delimiter region of pixels formed between the panels. The processor may be further configured to transmit the combined frame over a network for output on a display device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

To address the issues identified above, the inventors have recognized that combining multiple individual video streams into a single combined stream on a server, and then compressing the combined stream and transmitting it to a display device can offer advantages over sending multiple individual video streams in parallel, in terms of both reduced bandwidth consumption and reduced processing resources required for compression at the server and decompression at the destination device. However, compressing and decompressing the combined stream may have the potential disadvantage that compression artifacts can form on the boundaries between the portions of each frame that contained the individual component streams, due to encoding schemes used by most video compression algorithms.

Figure 1:
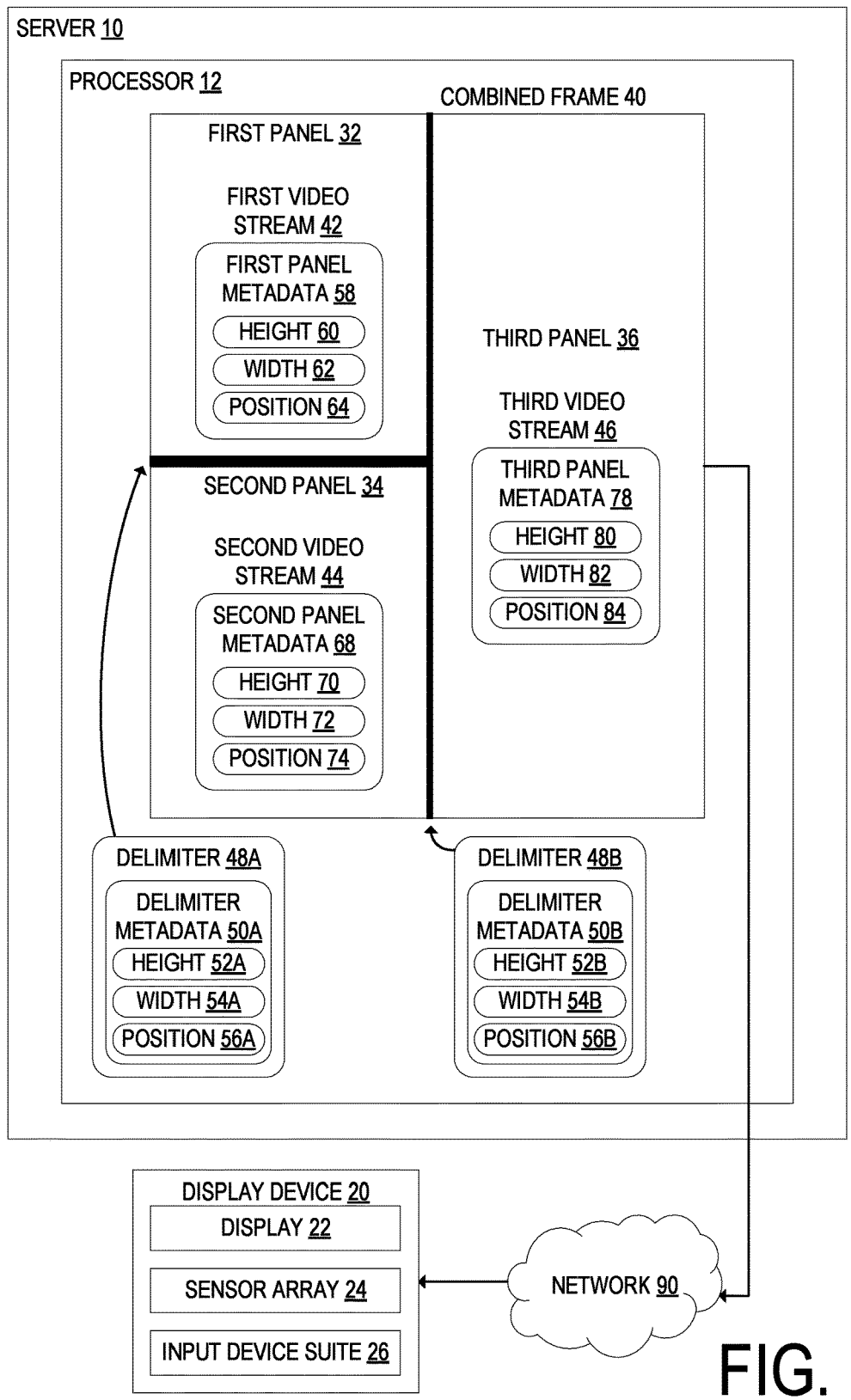
FIG. 1 shows a schematic representation of an example embodiment of a server comprising a processor configured to produce a combined frame from two or more video streams, according to one embodiment of the present disclosure.

To address the above issues, systems and methods incorporating a video stream delimiter for a combined frame are provided. A schematic representation an example embodiment of a server 10 configured for this purpose is depicted in FIG. 1. The server 10 comprises a processor 12 configured to produce a combined frame 40 from two or more video streams. In the exemplary embodiment depicted in FIG. 1, the two or more video streams include a first video stream 42, a second video stream 44, and a third video stream 46. The combined frame 40 is not limited to three video streams as shown in FIG. 1, but may be produced from any number of video streams greater than one. The combined frame 40 also includes two or more panels, wherein each panel includes one of the two or more video streams. In the exemplary embodiment depicted in FIG. 1, the first video stream 42 is encoded in a first panel 32, the second video stream 44 is encoded in a second panel 34, and the third video stream 46 is encoded in a third panel 36.

The term "video stream" as used in the present disclosure encompasses streaming moving images, which may be captured by a camera or rendered graphics, and thus does not refer exclusively to video taken with a camera. Thus, the video streams contained within the combined frame 40 may include rendered graphics data produced by one or more application programs, and also may include an image stream captured by a camera. As one specific example, video streams may be images of objects in a video game. As another example, the image streams may be video captured by a web enabled camera. It will be appreciated that streams of different types may be combined into a combined frame 40. Thus, one or more video streams generated using a camera may be used in combined frame 40 along with video streams that include rendered graphics data.

The combined frame 40 also includes panel metadata associated with each panel. In FIG. 1, the three panels are shown as having first panel metadata 58, second panel metadata 68, and third panel metadata 78 respectively. The panel metadata for each panel indicates a set of coordinates for that panel. The coordinates include at least a height, width, and position (origin coordinate) of that panel. In FIG. 1, the first panel metadata 58 includes a height 60, a width 62, and a position 64; the second panel metadata 68 includes a height 70, a width 72, and a position 74; and the third panel metadata 78 includes a height 80, a width 82, and a position 84. The processor 12 may be configured to encode each panel within the combined frame to have the height, width, and location indicated in the panel metadata associated with that panel. When the panel metadata includes additional properties of the panels, the processor 12 may be further configured to encode each panel according to the properties of the additional metadata. Further, the display device 20 may be configured to render each video stream by reading the metadata for the stream located within the panel, and based on the metadata reading the data for the stream from the combined frame at the height, width and location within the combined frame indicated by the metadata for that stream.

It will be appreciated that the set of metadata associated with each panel may also include other metadata in addition to coordinates. For example, the server 10 may perform image recognition on the video streams to identify features present in the streams. The metadata may then include identifications of the features present in the streams, along with coordinates of those features.

The combined frame 40 also includes at least one delimiter region 48 of pixels formed between the panels. Two delimiters 48 are shown in FIG. 1: a horizontal delimiter 48A that separates the first panel 32 from the second panel 34, and a vertical delimiter 48B that separates the first panel 32 and the second panel 34 from the third panel 36.

In some embodiments, the combined frame 40 may include delimiter metadata 50 associated with each delimiter 48. The delimiter metadata 50 may indicate a set of coordinates for each delimiter 48. The coordinates of each delimiter 48 may indicate a height, width, and position of that delimiter 48. In FIG. 1, the delimiter metadata 50A of the first delimiter 48A includes a height 52A, a width 54A, and a position 56A. The delimiter metadata 50B of the second delimiter 48B includes a height 52B, a width 54B, and a position 56B. The delimiter metadata 50 may also include other properties of a delimiter 48, such as color. The processor 12 may be configured to render each delimiter 48 to have the height, width, and location indicated in the delimiter metadata 50 associated with that delimiter 48. When the delimiter metadata 50 includes additional properties of the delimiters 48, the processor 12 may be further configured to render each delimiter 48 to have those properties.

The processor 12 transmits the combined frame 40 over a network 90 for output on a display device 20. The network 90 may be a local area network, a wide area network such as the Internet, a wireless telephone network, or some other type of network. The display device 20 may include a display 22. The display device 20 may also include a sensor array 24 and/or an input device suite 26. The panels and delimiters may be displayed on the display device 20 with the heights, widths, and locations indicated for them in their respective sets of metadata.

Figure 2:
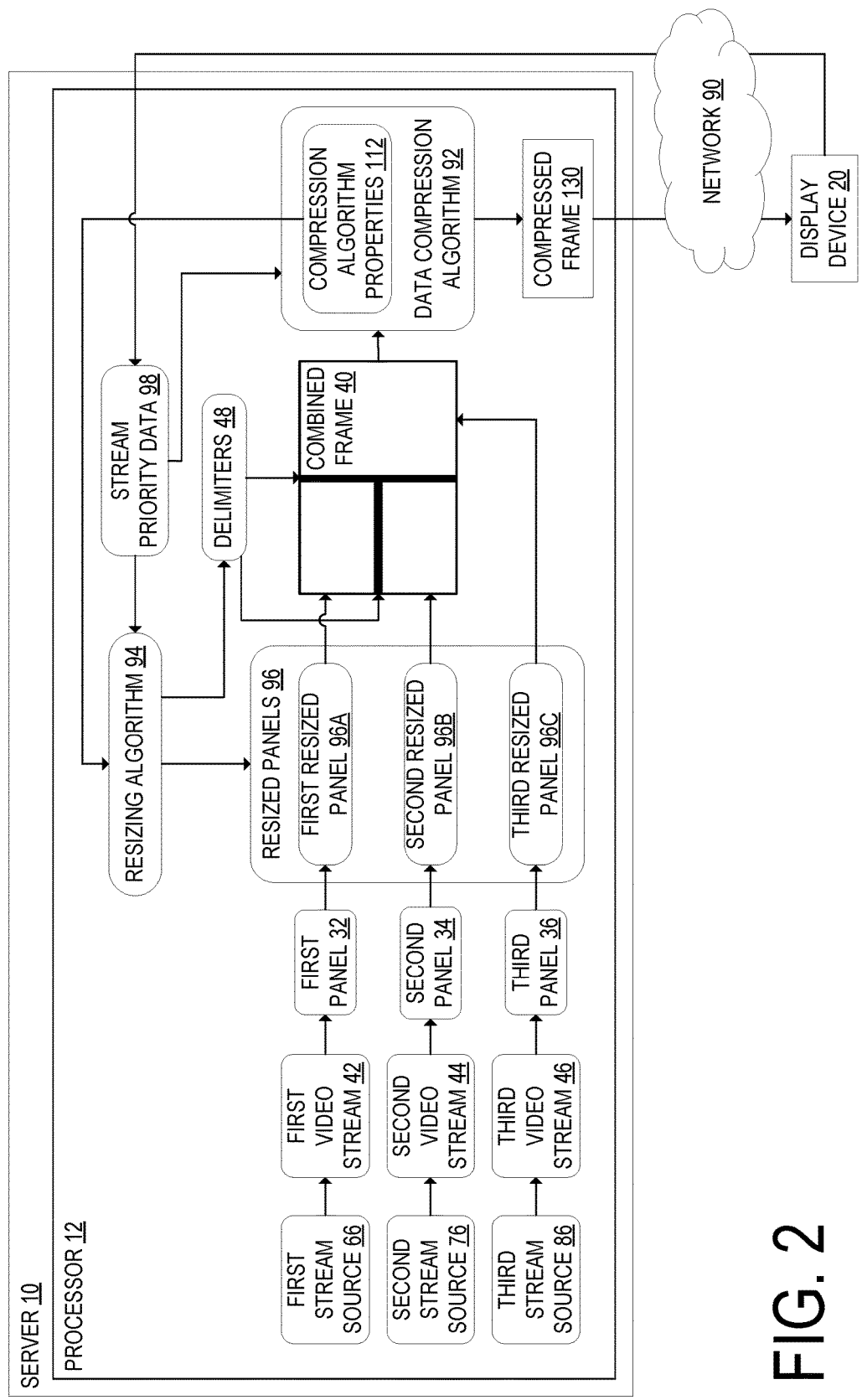
FIG. 2 shows a schematic representation of the resizing and compression of video streams and delimiters, according to one embodiment of the present disclosure.

FIG. 2 shows a schematic depiction of an example of the production of the combined frame 40 and the transmission of the combined frame 40 to a display device 20. The processor 12 of the server 10 may be configured to obtain two or more video streams from video stream sources and form panels from those video streams. In the example schematically depicted in FIG. 2, the processor 12 obtains the first video stream 42 from a first stream source 66, the second video stream 44 from a second stream source 76, and the third video stream 46 from a third stream source 86. The processor 12 then produces a first panel 32 using the first video stream 42, a second panel 34 using the second video stream 44, and a third panel 36 using the third video stream 46. Producing panels using the video streams may include producing panel metadata associated with the panels.

The processor 12 may be configured to modify a height and/or width of at least one of the panels. A resizing algorithm 94 may be applied to the panels to produce resized panels 96. When at least one of the panels is resized, the resizing algorithm 94 may also resize one or more other panels so that the combined frame 40 has a constant height and width from one frame of video to the next. In the example schematically depicted in FIG. 2, the resizing algorithm 94 converts the first panel 32 into a first resized panel 96A, the second panel 34 into a second resized panel 96B, and the third panel 36 into a third resized panel 96C.

The resizing algorithm 94 may determine the sizes of the resized panels 96 based at least in part on a set of stream priority data 98. The stream priority data 98 may include data such as heights and/or widths of the panels, scale factors for the panels, and/or locations of the panels. The stream priority data 98 may be determined based on inputs from the display device 20 transmitted to the server 10 over the network 90. For example, the display device 20 may be configured to track a user's gaze. The display device 20 may then produce stream priority data 98 that includes instructions to increase the size of a panel when the user looks at it for a predetermined amount of time and decrease the size of a panel when the user looks away from it for a predetermined amount of time. In response to receiving stream priority data 98 indicating that a first panel 32 has a lower priority than a second panel 34, the processor 12 may be configured to decrease the height and/or width of the first panel 32 and increase the height and/or width of the second panel 34.

The resizing algorithm 94 may also produce at least one delimiter 48 between the resized panels 96. In FIG. 2, the resizing algorithm 94 produces two delimiters 48, one of which is horizontal and the other of which is vertical. The processor 12 may be configured to combine the resized panels 96 and the delimiters 48 into a combined frame 40. The resized panels 96 and the delimiters 48 may be positioned in the combined frame 40 based on their respective metadata.

The processor 12 may be configured to compress at least one panel using a data compression algorithm 92. The data compression algorithm 92 may compress at least one panel of the combined frame 40 to produce a compressed frame 130 that includes less data than the combined frame 40 in its original form. For example, the data compression algorithm 92 may decrease the number of bits used to encode the color of each pixel in the combined frame 40. The processor 12 may make a determination of what data compression algorithm 92 to use based at least in part on the stream priority data 98. For example, if the stream priority data 98 indicates that the priority of a panel is high, the processor 12 may use a data compression algorithm 92 that compresses that panel less, and if the stream priority data 98 indicates that the priority of a panel is low, the processor 12 may use a data compression algorithm 92 that compresses that panel more. The processor 12 may be configured to apply a plurality of different data compression algorithms 92 to the panels, wherein the different data compression algorithms 92 are applied to different panels of the combined frame 40.

The resizing algorithm 94 may be configured to receive a set of compression algorithm properties 112 from the data compression algorithm 92. The compression algorithm properties 112 may include information about what type of data compression algorithm 92 is used for each panel and what modifications the data compression algorithm 92 may make to the panels. For example, the data compression algorithm 92 applied to at least one panel may include a step in which it groups pixels of the at least one panel into pixel blocks of height m pixels and width n pixels, wherein m and n are integers. If the data compression algorithm 92 divides panels into pixel blocks of height m pixels and width n pixels, the values of m and n may be included in the compression algorithm properties 112. The compression algorithm properties 112 may be used by the resizing algorithm 94 in the determination of the delimiter metadata 50.

Once the processor 12 has produced a compressed frame 130, the compressed frame 130 may be transmitted over the network 90 for display on the display device 20.

Figure 3:
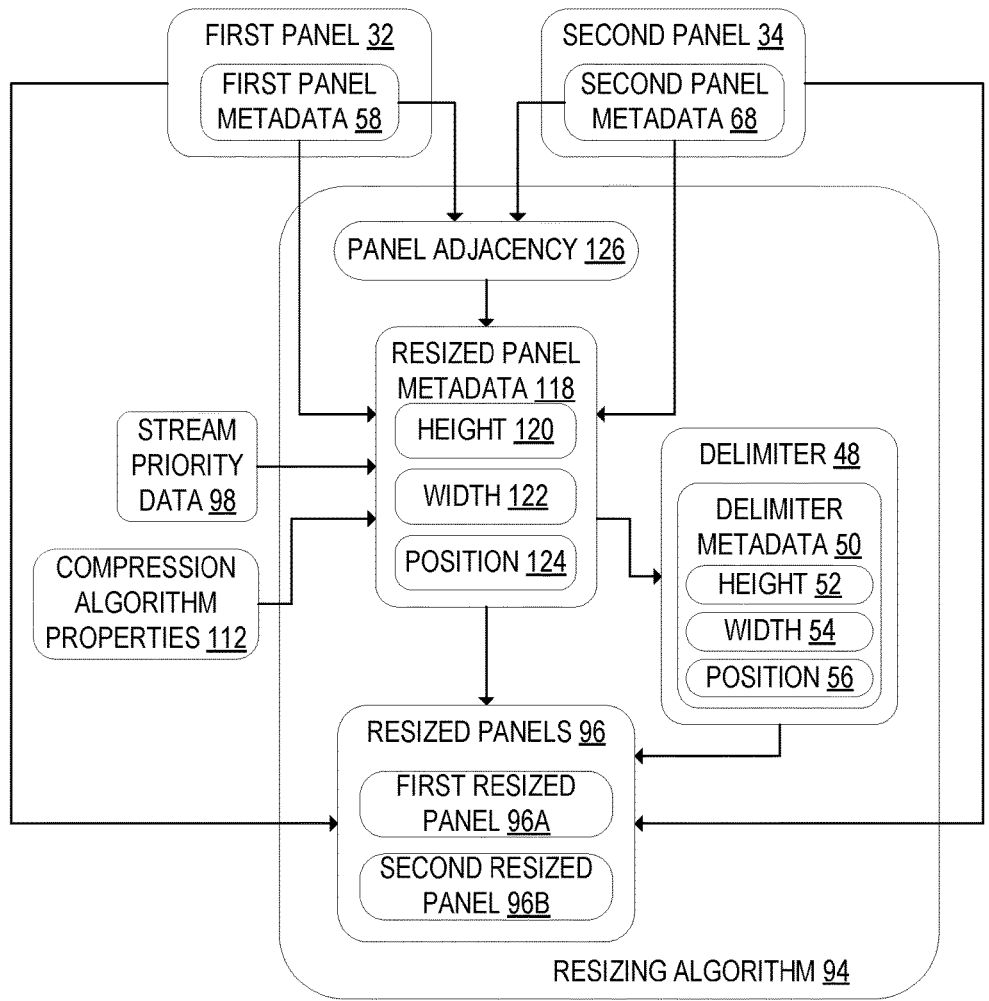
FIG. 3 shows a schematic representation of the resizing algorithm, according to one embodiment of the present disclosure.

FIG. 3 shows a schematic representation of the resizing algorithm 94 in an example embodiment in which two video streams are combined. In this example embodiment, the inputs of the resizing algorithm 94 include a first panel 32, including first panel metadata 58; a second panel 34, including second panel metadata 68; stream priority data 98; and compression algorithm properties 112. The resizing algorithm 94 may use the first panel metadata 58 and second panel metadata 68 to determine panel adjacency 126. The processor 12 may be configured to determine whether the first panel 32 is adjacent to the second panel 34 in a horizontal or vertical direction. Although such a scenario is not depicted in FIG. 3, when there are more than two panels, the resizing algorithm 94 may determine whether an adjacency exists between each pair of panels.

Based on the panel adjacency 126, the first panel metadata 58, and the second panel metadata 68, the resizing algorithm 94 may then determine resized panel metadata 118 for each of the two resized panels 96. The resized panel metadata 118 may include a height 120, width 122, and/or position 124 for each of the resized panels 96.

Based at least in part on the resized panel metadata 118, the resizing algorithm 94 may generate a delimiter 48 between the panels. The resizing algorithm 94 may also generate delimiter metadata 50 that may include a height 52, width 54, and position 56 of the delimiter 48. Using the resized panel metadata 118 and the delimiter metadata 50, the resizing algorithm 94 may produce resized panels 96. In the example embodiment of FIG. 3, the resized panels 96 include a first resized panel 96A and a second resized panel 96B.

Figure 4:
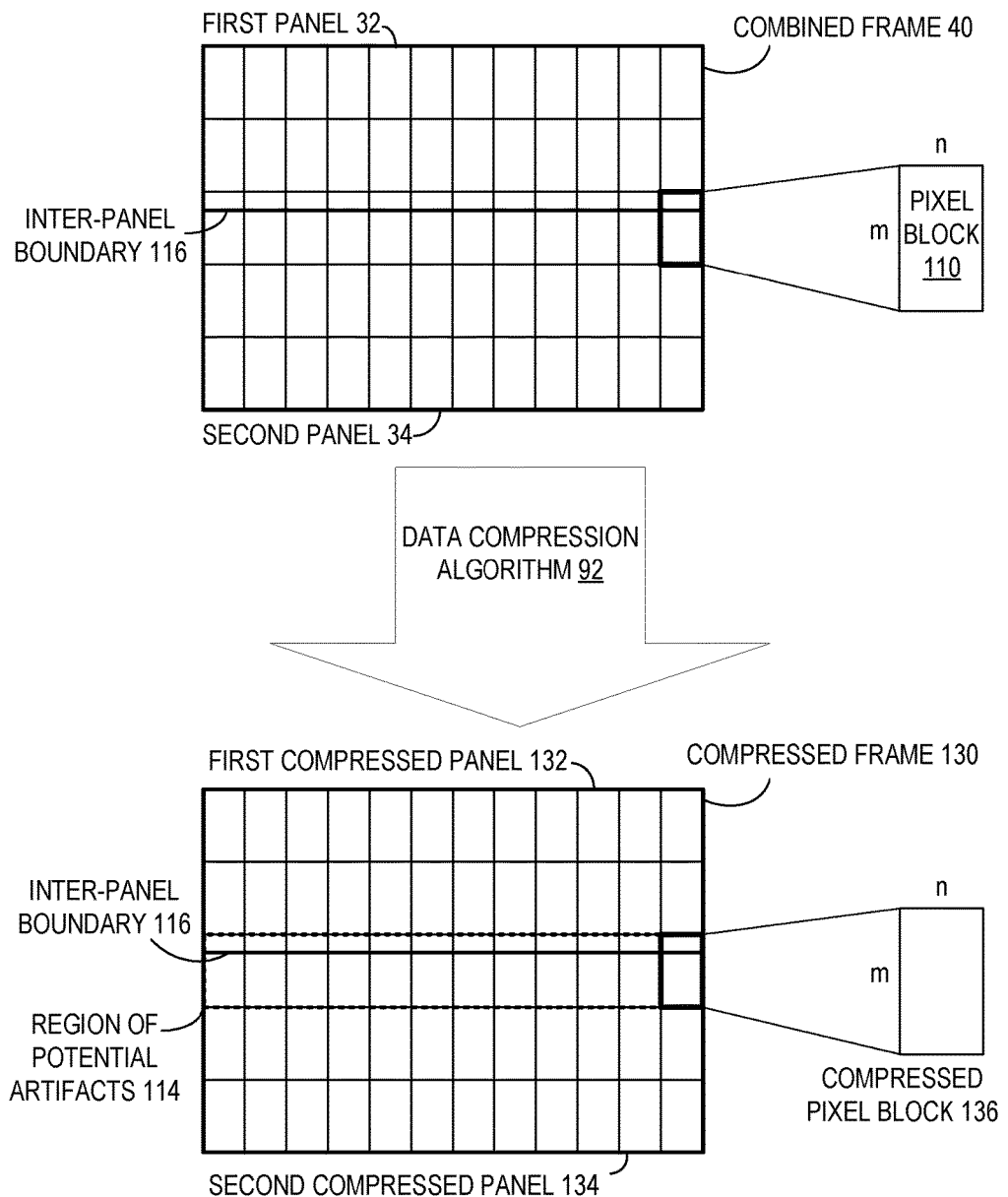
FIG. 4 shows an example representation of the effect of a data compression algorithm on the combined frame when a delimiter is not used, according to one embodiment of the present disclosure.

After the combined frame 40 is generated, it may be compressed using a data compression algorithm 92. An example depiction of the compression of two panels of a combined frame 40 without the use of a delimiter is shown in FIG. 4. In FIG. 4, the combined frame 40 includes a first panel 32 and a second panel 34 that share an inter-panel boundary 116. The first panel 32 and second panel 34 are directly adjacent to each other with no delimiter between them. A data compression algorithm 92 is applied to the combined frame 40 to produce a compressed frame 130. When the data compression algorithm 92 is applied to the panels of the combined frame 40, the data compression algorithm 92 groups pixels of the panels into pixel blocks 110 of height m pixels and width n pixels, wherein m and n are integers. Grouping the pixels of the panels into pixel blocks 110 allows the data compression algorithm 92 to produce the compressed frame 130 more quickly, because it allows the data compression algorithm 92 to take into account only a small number of other pixels when determining the properties of each pixel in a corresponding compressed pixel block 136 in the compressed frame 130, rather than using the properties of all the other pixels in the panel.

When there is no delimiter, a pixel block 110 may include pixels from two or more panels. The highlighted pixel block 110 is part of a row of pixel blocks that include parts of the first panel 32 and the second panel 34. When the data compression algorithm 92 modifies the pixels of pixel blocks 110 in that row, the row becomes a region of potential artifacts 114. Artifacts may form due to the use of pixels from one panel to determine the properties of pixels in another panel in the compressed frame 130. For example, the resizing algorithm 94 may average RGB color values of pixels in a block 110 of the combined frame 40 to determine the colors of pixels in the corresponding compressed pixel block 136 in the compressed frame 130. If an area of the first panel 32 is adjacent to an area of the second panel 34 that has a different color, the row of compressed pixel blocks 136 on the boundary between the first compressed panel 132 and the second compressed panel 134 may be a third color. Such a region of potential artifacts 114 may be aesthetically displeasing and may diminish the user experience.

Figure 5:
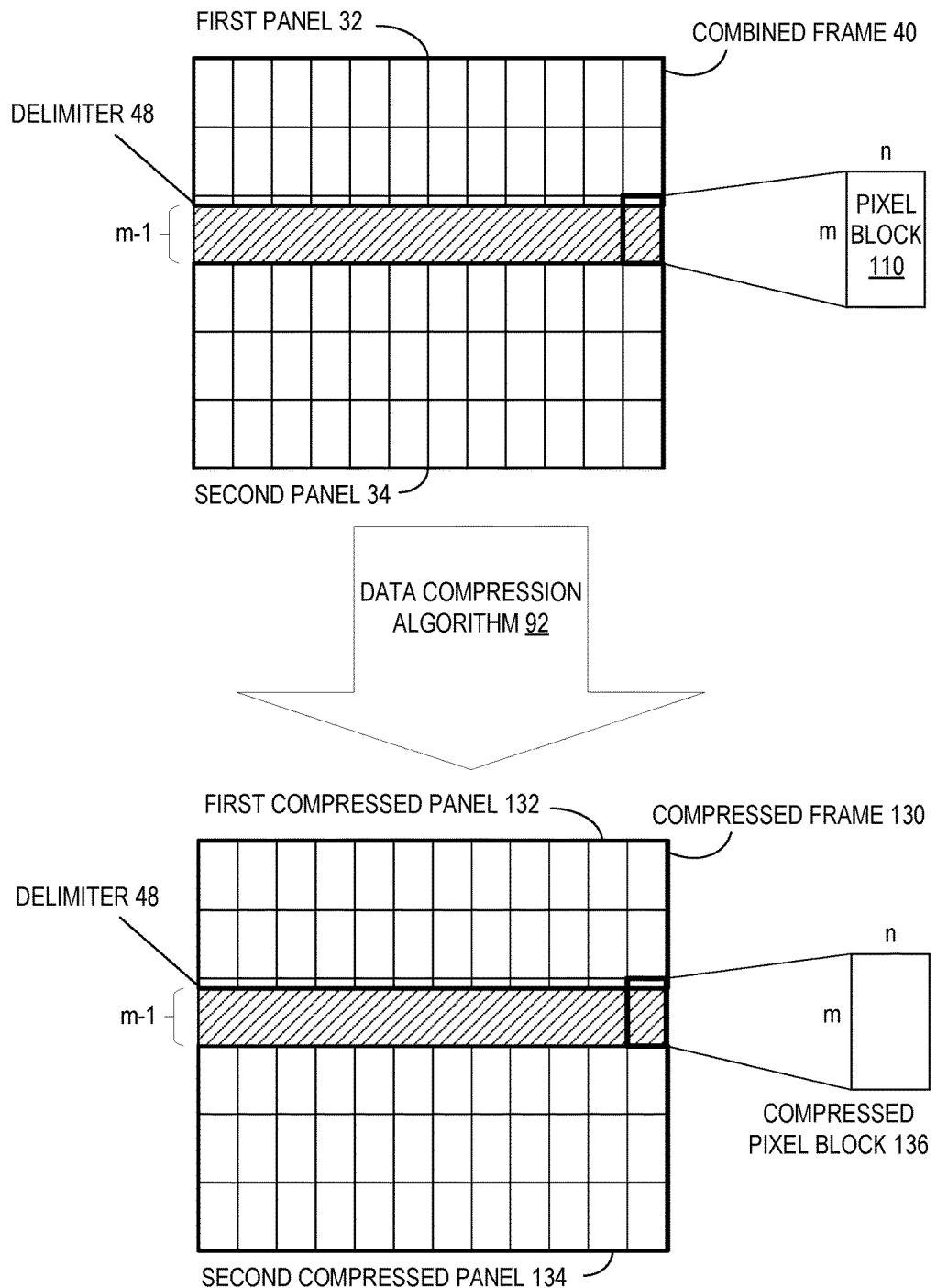
FIG. 5 shows an example representation of the effect of a data compression algorithm on the combined frame when a delimiter is used, according to one embodiment of the present disclosure.

As a solution to the problem of artifacts, a delimiter may be generated between the panels. FIG. 5 depicts an example of compressing two panels of a combined frame 40 when a delimiter 48 between the panels is used. As in the previous example, the combined frame 40 includes a first panel 32 and a second panel 34, but also includes a delimiter 48 between the panels. When the data compression algorithm 92 divides at least one panel into pixel blocks 110 of height m pixels and width n pixels, the data compression algorithm 92 may use the values of m and n in determining the height 52 and width 54 of the delimiter 48. The delimiter 48 between the first panel 32 and the second panel 34 may have a height 52 of at least m−1 pixels and a width 54 of at least n−1 pixels. A height 52 of m−1 pixels and a width 54 of n−1 pixels is the minimum size for which no pixel blocks 110 will include pixels from both the first panel 32 and the second panel 34. When the data compression algorithm 92 transforms the first panel 32 and second panel 34 into a first compressed panel 132 and a second compressed panel 134, artifacts do not form, because none of the compressed pixel blocks 136 include pixels from both the first compressed panel 132 and the second compressed panel 134.

Figure 6:
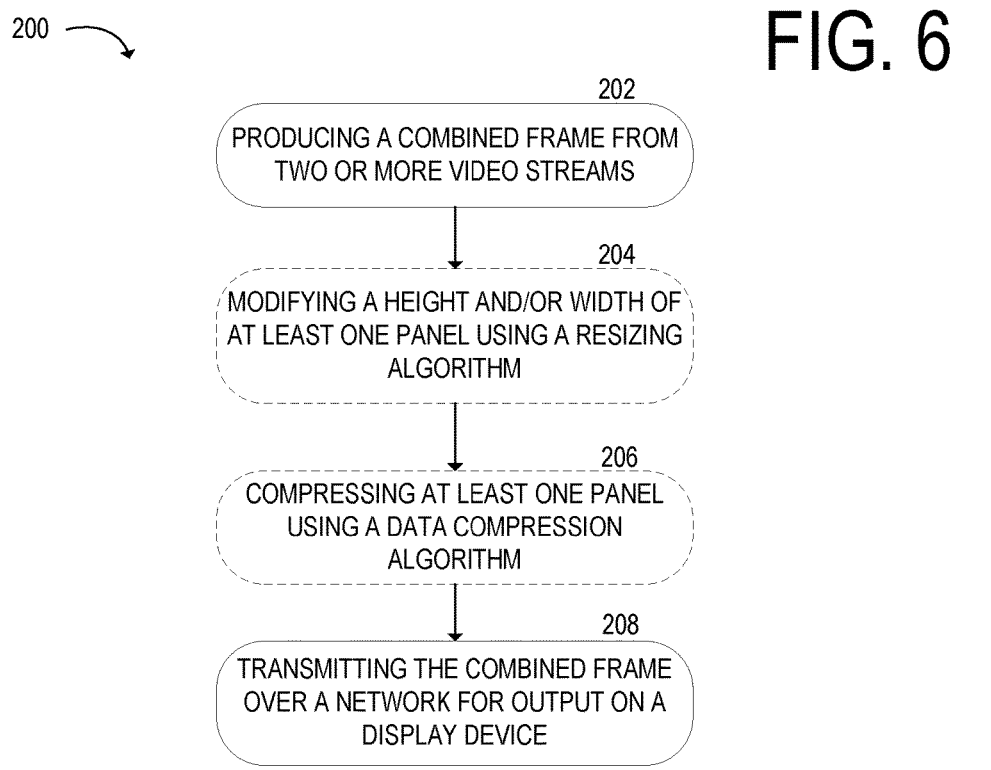
FIG. 6 shows an example method for producing a combined frame and transmitting it to a display device, according to one embodiment of the present disclosure.

FIG. 6 shows a flowchart of a method 200 for use with a server 10. At step 202 of the method 200, the server 10 produces a combined frame 40 from two or more video streams. The video streams are not limited to video taken using a camera, but may instead or additionally include rendered graphics data produced by one or more application programs. When the video streams include rendered graphics data, the rendered graphics data may be converted into a video format.

The combined frame 40 includes two or more panels, wherein each panel includes one of the two or more video streams. The combined frame 40 further includes panel metadata indicating a set of coordinates for each panel. The coordinates of each panel indicate a height, width, and position of that panel. Each panel of the combined frame 40 may be rendered to have the height, width, and location indicated in the panel metadata associated with that panel. The panel metadata for each panel may also include other properties of that panel.

The combined frame 40 further includes at least one delimiter region 48 of pixels formed between the panels. The combined frame 40 may also include delimiter metadata 50 indicating a set of coordinates for each delimiter 48. The coordinates of each delimiter 48 may indicate a height, width, and position of that delimiter 48, and each delimiter 48 may be rendered to have the height, width, and location indicated in the delimiter metadata 50 associated with that delimiter 48. The delimiter metadata 50 for each delimiter 48 may also include other properties of that delimiter 48.

At step 204 of the method 200, a height and/or width of at least one of the panels may be modified using a resizing algorithm 94. The resizing algorithm 94 may modify the height and/or width of the at least one panel based at least in part on a set of stream priority data 98. At step 206, at least one panel may also be compressed using a data compression algorithm 92 to produce a compressed frame 130. Compressing a frame reduces the amount of data that the server 10 has to transmit to the display device 20, thus reducing the time and cost of transmission. At step 208, the server 10 then transmits the combined frame 40, which may be a compressed frame 130, over a network 90 for output on a display device 20.

Figure 7:
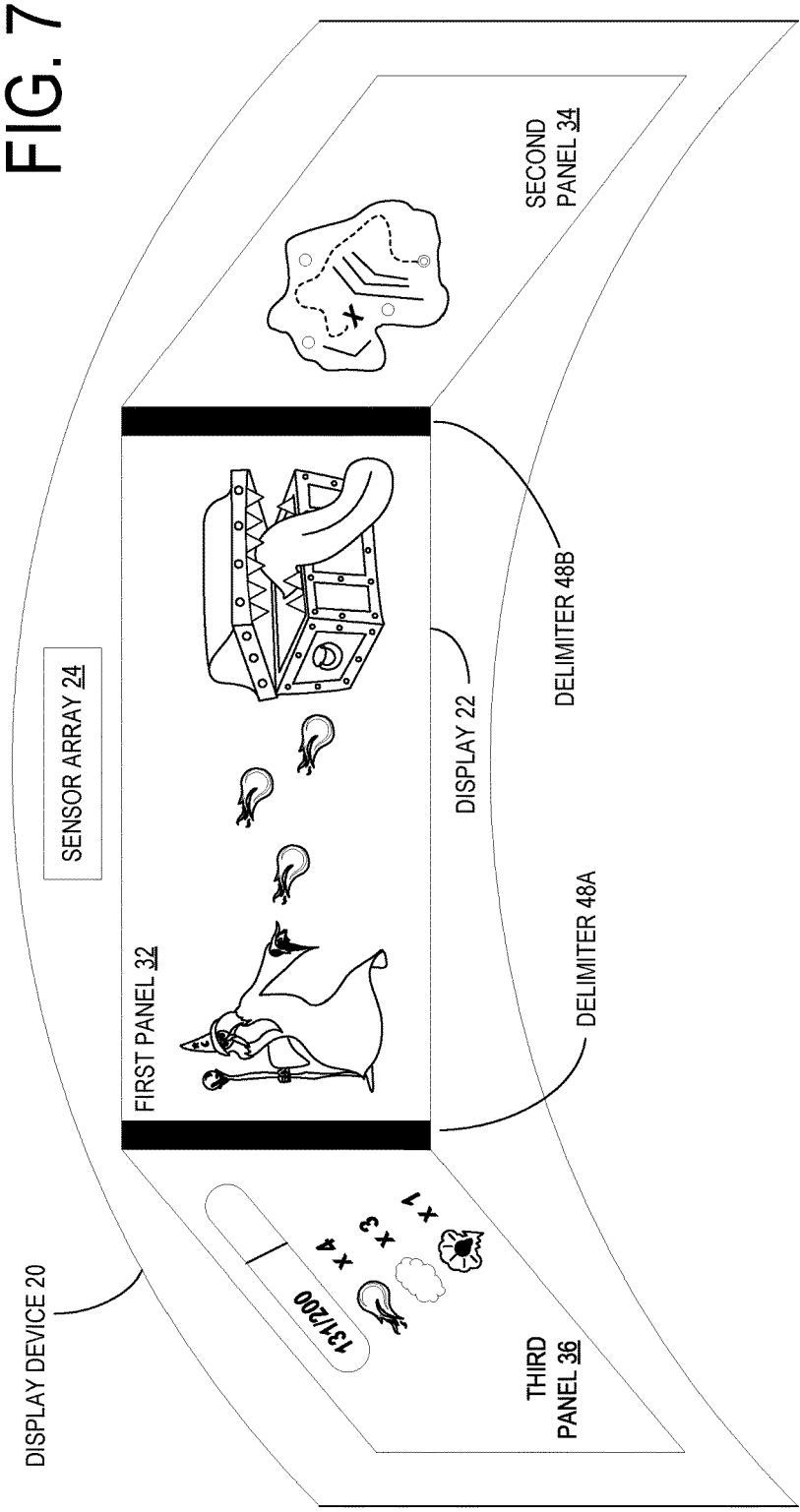
FIG. 7 shows display of a display device in an example use case scenario, according to one embodiment of the present disclosure.

The display 22 of a display device 20 in an example use case scenario is depicted in FIG. 7. In this example use case scenario, the display device 20 is a head-mounted display device. The server 10 is configured to execute a video game application program, produce a combined frame 40 from three video streams, and transmit the combined frame 40 for display on the display device 20. The combined frame 40 includes a first panel 32, a second panel 34, and a third panel 36. Each panel includes one of the three video streams. The first panel 32 is a main panel in which a first video stream 42 that depicts most of the events in the video game is displayed. The second panel 34 and third panel 36 are both peripheral panels that display other information related to the game. In this example, the second panel 34 displays a map and the third panel 36 displays a health bar and an inventory.

The processor 12 may receive a set of stream priority data 98 from the display device 20. For example, the head-mounted display device 20 may track the user's gaze using a sensor array 24 to determine which panel the user is looking at. Gaze data produced this way may be included in the stream priority data 98. The processor 12 may modify a height and/or width of at least one of the panels using a resizing algorithm 94. The modification of the height and/or width of at least one of the panels may be made based at least in part on the stream priority data 98.

In the example use case scenario of FIG. 7, the user may wish to view the map depicted in the second panel 34 in more detail. If the sensor array 24 detects that the user has looked at the second panel 34 for more than a predetermined amount of time, the display device 20 may output stream priority data 98 indicating that the priority of the first panel 32 has decreased and the priority of the second panel 34 has increased. In response to receiving this stream priority data 98, the resizing algorithm 94 may increase the width and/or height of the second panel 34 and decrease the width and/or height of the first panel 32.

The combined frame 40 also includes two delimiter regions 48A and 48B of pixels formed between the panels. The delimiters 48A and 48B allow the panels to be resized and compressed without the formation of artifacts.

The processor 12 may also compress at least one of the panels using a data compression algorithm 92. The processor 12 may use different data compression algorithms 92 for the different panels, and may determine what data compression algorithm 92 to use for a panel based at least in part on the stream priority data 98. For example, when the processor 12 receives stream priority data 98 indicating that the priority of the first panel 32 has decreased and the priority of the second panel 34 has increased, the processor 12 may perform a data compression algorithm 92 on the first panel 32 that produces a first compressed panel 132 with a lower resolution than the second compressed panel 134. The processor 12 may then transmit the compressed frame 130 over a network 90 for output on the display device 20.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
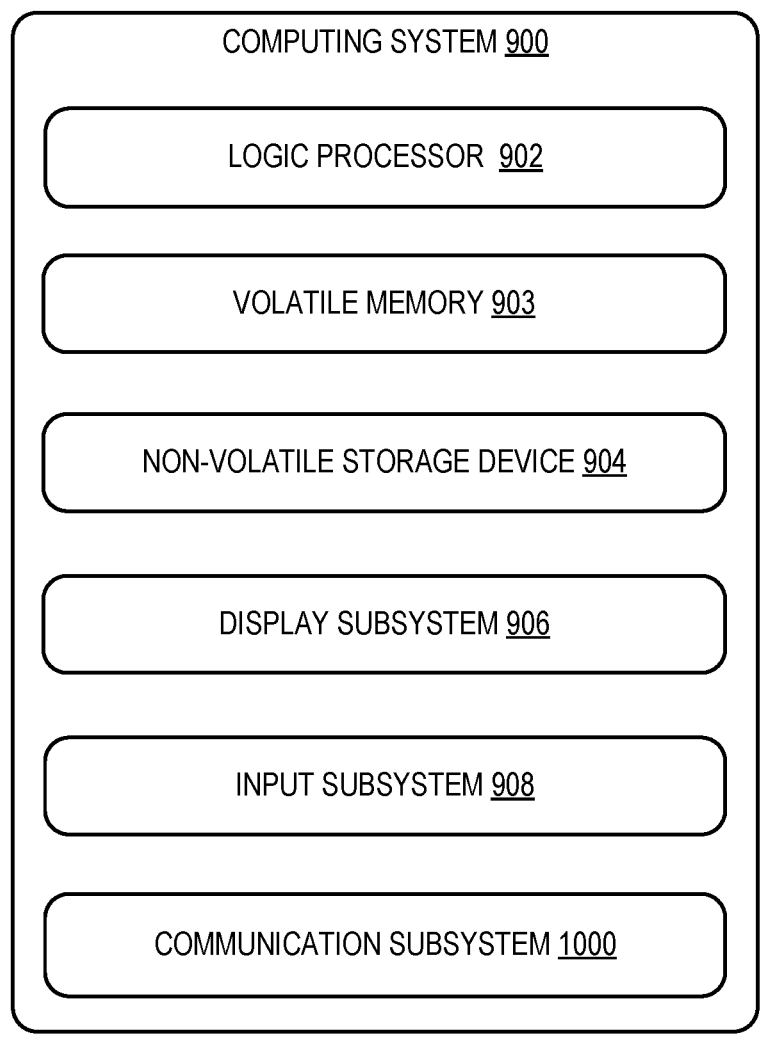
FIG. 8 shows an example computing system, according to one embodiment of the present disclosure.

FIG. 8 schematically shows a non-limiting embodiment of a computing system 900 that can enact one or more of the methods and processes described above. Computing system 900 is shown in simplified form. Computing system 900 may embody the server 10 of FIG. 1. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 903, and a non-volatile storage device 904. Computing system 900 may optionally include a display subsystem 906, input subsystem 908, communication subsystem 1000, and/or other components not shown in FIG. 8.

Logic processor 902 includes one or more physical devices configured to execute instructions. For example, the logic processor 902 may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 902 may include one or more physical processors (hardware) configured to execute software instructions. Additionally or alternatively, the logic processor 902 may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor 902 optionally may be distributed among two or more separate devices, which may be remotely located and/or configured for coordinated processing. Aspects of the logic processor 902 may be virtualized and executed by remotely accessible, networked computing devices configured in a cloud-computing configuration. In such a case, these virtualized aspects are run on different physical logic processors of various different machines, it will be understood.

Non-volatile storage device 904 includes one or more physical devices configured to hold instructions executable by the logic processor 902 to implement the methods and processes described herein. When such methods and processes are implemented, the state of non-volatile storage device 904 may be transformed—e.g., to hold different data.

Non-volatile storage device 904 may include physical devices that are removable and/or built-in. Non-volatile storage device 904 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 904 may include nonvolatile, dynamic, static, read/write, read-only, sequential-access, location-addressable, file-addressable, and/or content-addressable devices. It will be appreciated that non-volatile storage device 904 is configured to hold instructions even when power is cut to the non-volatile storage device 904.

Volatile memory 903 may include physical devices that include random access memory. Volatile memory 903 is typically utilized by logic processor 902 to temporarily store information during processing of software instructions. It will be appreciated that volatile memory 903 typically does not continue to store instructions when power is cut to the volatile memory 903.

Aspects of logic processor 902, volatile memory 903, and non-volatile storage device 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 904, using portions of volatile memory 903. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 906 may be used to present a visual representation of data held by non-volatile storage device 904. The visual representation may take the form of a graphical user interface (GUI). As the herein described methods and processes change the data held by the non-volatile storage device, and thus transform the state of the non-volatile storage device, the state of display subsystem 906 may likewise be transformed to visually represent changes in the underlying data. Display subsystem 906 may include one or more display devices utilizing virtually any type of technology. Such display devices may be combined with logic processor 902, volatile memory 903, and/or non-volatile storage device 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1000 may be configured to communicatively couple various computing devices described herein with each other, and with other devices. Communication subsystem 1000 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

The following paragraphs provide additional support for the claims of the subject application. According to one aspect of the present disclosure, a server is provided, comprising a processor configured to produce a combined frame from two or more video streams. The combined frame may include two or more panels, wherein each panel includes one of the two or more video streams. The combined frame may further include panel metadata indicating a set of coordinates for each panel, wherein the coordinates of each panel indicate a height, width, and position of that panel. The panel may further include at least one delimiter region of pixels formed between the panels. The processor may be further configured to transmit the combined frame over a network for output on a display device.

According to this aspect, the combined frame may include delimiter metadata indicating a set of coordinates for each delimiter, wherein the coordinates of each delimiter indicate a height, width, and position of that delimiter. According to this aspect, the processor may be configured to render each delimiter to have the height, width, and location indicated in the delimiter metadata associated with that delimiter.

According to this aspect, the video streams may include rendered graphics data produced by one or more application programs, wherein the processor is configured to convert the rendered graphics data into a video format.

According to this aspect, the processor may be configured to modify a height and/or width of at least one of the panels using a resizing algorithm. According to this aspect, the resizing algorithm may modify the height and/or width of the at least one panel based at least in part on a set of stream priority data. According to this aspect, the processor may be configured to, in response to receiving stream priority data indicating that a first panel has a lower priority than a second panel, decrease the height and/or width of the first panel and increase the height and/or width of the second panel. According to this aspect, the combined frame may have a constant height and width.

According to this aspect, the processor may be configured to encode each panel in the combined frame to have the height, width, and location indicated in the panel metadata associated with that panel.

According to this aspect, the processor may be configured to compress at least one panel using a data compression algorithm. According to this aspect, the data compression algorithm may group pixels of the at least one panel into pixel blocks of height m pixels and width n pixels, wherein m and n are integers. According to this aspect, the delimiter between the first panel and the second panel may have a height of at least m−1 pixels and a width of at least n−1 pixels.

According to another aspect of the present disclosure, a method for use with a server is provided, comprising producing a combined frame from two or more video streams. The combined frame may include two or more panels, wherein each panel includes one of the two or more video streams. The combined frame may further include panel metadata indicating a set of coordinates for each panel, wherein the coordinates of each panel indicate a height, width, and position of that panel. The combined frame may further include at least one delimiter region of pixels formed between the panels. The method may further include transmitting the combined frame over a network for output on a display device.

According to this aspect, the combined frame may include delimiter metadata indicating a set of coordinates for each delimiter, wherein the coordinates of each delimiter indicate a height, width, and position of that delimiter. Each delimiter may be rendered to have the height, width, and location indicated in the delimiter metadata associated with that delimiter.

According to this aspect, the video streams may include rendered graphics data produced by one or more application programs, wherein the rendered graphics data is converted into a video format.

According to this aspect, a height and/or width of at least one of the panels may be modified using a resizing algorithm. According to this aspect, the resizing algorithm may modify the height and/or width of the at least one panel based at least in part on a set of stream priority data.

According to this aspect, each panel may be rendered to have the height, width, and location indicated in the panel metadata associated with that panel.

According to this aspect, at least one panel may be compressed using a data compression algorithm.

According to another aspect of the present disclosure, a server is provided, comprising a processor configured to produce a combined frame from three or more video streams. The combined frame may include three or more panels including a main panel and two or more peripheral panels, wherein each panel includes one of the three or more video streams. The combined frame may further include at least one delimiter region of pixels formed between the panels. The processor may be further configured to receive a set of stream priority data. The processor may be further configured to modify a height and/or width of at least one of the panels using a resizing algorithm, wherein the modification is made based at least in part on the stream priority data. The processor may be further configured to compress at least one of the panels using a data compression algorithm. The processor may be further configured to transmit the combined frame over a network for output on a display device, wherein the display device is a head-mounted display device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A server, comprising:
a processor configured to:
produce a combined frame from two or more video streams, wherein the combined frame includes:
two or more panels, wherein each panel includes one of the two or more video streams; and
at least one delimiter region of pixels formed between the panels;
produce panel metadata indicating a set of coordinates for each panel, wherein the coordinates of each panel indicate a height, width, and position of that panel;
produce delimiter metadata indicating a set of coordinates for each delimiter; and
transmit the combined frame, panel metadata, and delimiter metadata over a network for output on a display device.

2. The server of claim 1, wherein the processor is configured to render each delimiter to have a height, width, and location indicated in the delimiter metadata associated with that delimiter.

3. The server of claim 1, wherein the video streams include rendered graphics data produced by one or more application programs, wherein the processor is configured to convert the rendered graphics data into a video format.

4. The server of claim 1, wherein the processor is configured to modify a height and/or width of at least one of the panels using a resizing algorithm.

5. The server of claim 4, wherein the resizing algorithm modifies the height and/or width of the at least one panel based at least in part on a set of stream priority data.

6. The server of claim 5, wherein the processor is configured to, in response to receiving stream priority data indicating that a first panel has a lower priority than a second panel, decrease the height and/or width of the first panel and increase the height and/or width of the second panel.

7. The server of claim 4, wherein the combined frame has a constant height and width.

8. The server of claim 1, wherein the processor is configured to encode each panel in the combined frame to have the height, width, and location indicated in the panel metadata associated with that panel.

9. The server of claim 1, wherein the processor is configured to compress at least one panel using a data compression algorithm.

10. The server of claim 9, wherein the data compression algorithm groups pixels of the at least one panel into pixel blocks of height m pixels and width n pixels, wherein m and n are integers.

11. The server of claim 10, wherein the delimiter between the first panel and the second panel has a height of at least m−1 pixels and a width of at least n−1 pixels.

12. A method for use with a server, comprising:
producing a combined frame from two or more video streams, wherein the combined frame includes:
two or more panels, wherein each panel includes one of the two or more video streams; and
at least one delimiter region of pixels formed between the panels;
producing panel metadata indicating a set of coordinates for each panel, wherein the coordinates of each panel indicate a height, width, and position of that panel;
producing delimiter metadata indicating a set of coordinates for each delimiter; and transmitting the combined frame, panel metadata, and delimiter metadata over a network for output on a display device.

13. The method of claim 12, wherein each delimiter is rendered to have a height, width, and location indicated in the delimiter metadata associated with that delimiter.

14. The method of claim 12, wherein the video streams include rendered graphics data produced by one or more application programs, wherein the rendered graphics data is converted into a video format.

15. The method of claim 12, wherein a height and/or width of at least one of the panels is modified using a resizing algorithm.

16. The method of claim 15, wherein the resizing algorithm modifies the height and/or width of the at least one panel based at least in part on a set of stream priority data.

17. The method of claim 12, each panel is rendered to have the height, width, and location indicated in the panel metadata associated with that panel.

18. The method of claim 12, wherein at least one panel is compressed using a data compression algorithm.

19. A server, comprising:
a processor configured to:
  produce a combined frame from three or more video streams, wherein the combined frame includes:
    three or more panels including a main panel and two or more peripheral panels, wherein each panel includes one of the three or more video streams; and
    at least one delimiter region of pixels formed between the panels;
  produce delimiter metadata indicating a set of coordinates for each delimiter;
receive a set of stream priority data;
modify a height and/or width of at least one of the panels using a resizing algorithm, wherein the modification is made based at least in part on the stream priority data;
compress at least one of the panels using a data compression algorithm; and
transmit the combined frame and delimiter metadata over a network for output on a display device, wherein the display device is a head-mounted display device.

* * * * *